United States Patent [19]
Groves et al.

[11] Patent Number: 5,414,439
[45] Date of Patent: May 9, 1995

[54] HEAD UP DISPLAY WITH NIGHT VISION ENHANCEMENT

[75] Inventors: Doyle J. Groves, Kokomo; William G. Shogren, Noblesville; Joseph E. Harter, Jr., Fishers, all of Ind.

[73] Assignee: Delco Electronics Corporation, Kokomo, Ind.

[21] Appl. No.: 257,310

[22] Filed: Jun. 9, 1994

[51] Int. Cl.6 .................................................. G09G 5/00
[52] U.S. Cl. ................................... 345/7; 348/115
[58] Field of Search ........................ 345/7-9; 348/115; 359/630, 631; 340/436, 958, 961, 980

[56] References Cited

U.S. PATENT DOCUMENTS

| | | |
|---|---|---|
| 4,560,233 | 12/1985 | Banbury . |
| 4,671,614 | 6/1987 | Catalano . |
| 4,740,780 | 4/1988 | Brown et al. ............ 345/7 |
| 4,742,389 | 5/1988 | Schiffman . |
| 4,751,571 | 6/1988 | Lillquist . |
| 4,752,824 | 6/1988 | Moore . |
| 4,961,625 | 10/1990 | Wood et al. ............ 359/630 |
| 4,985,847 | 1/1991 | Shioya et al. . |
| 5,001,558 | 3/1991 | Burley et al. . |
| 5,051,735 | 9/1991 | Furukawa . |
| 5,053,755 | 10/1991 | Smith et al. . |
| 5,113,177 | 5/1992 | Cohen . |
| 5,115,398 | 5/1992 | DeJong . |
| 5,157,548 | 10/1992 | Monnier et al. . |
| 5,162,928 | 11/1992 | Taniguchi et al. . |
| 5,202,668 | 4/1993 | Nagami . |
| 5,210,624 | 5/1993 | Matsumoto et al. . |
| 5,231,379 | 7/1993 | Wood et al. . |
| 5,243,448 | 9/1993 | Banbury . |

*Primary Examiner*—Jeffery Brier
*Attorney, Agent, or Firm*—Jimmy L. Funke

[57] ABSTRACT

A motor vehicle is equipped with an infrared camera for viewing roadway conditions in terms of a thermal image, and outputs a video signal to a head up display (HUD) which projects the camera view to the operator via the windshield or other combiner to display a virtual image in the operator's field of view. The HUD is configured to magnify the image to the same size as the visual or real scene, and compensates for camera and windshield distortion. The virtual image is presented above or below the real scene or may be superimposed on the real scene. A video processor allows selection of only the warmest objects for display.

10 Claims, 2 Drawing Sheets

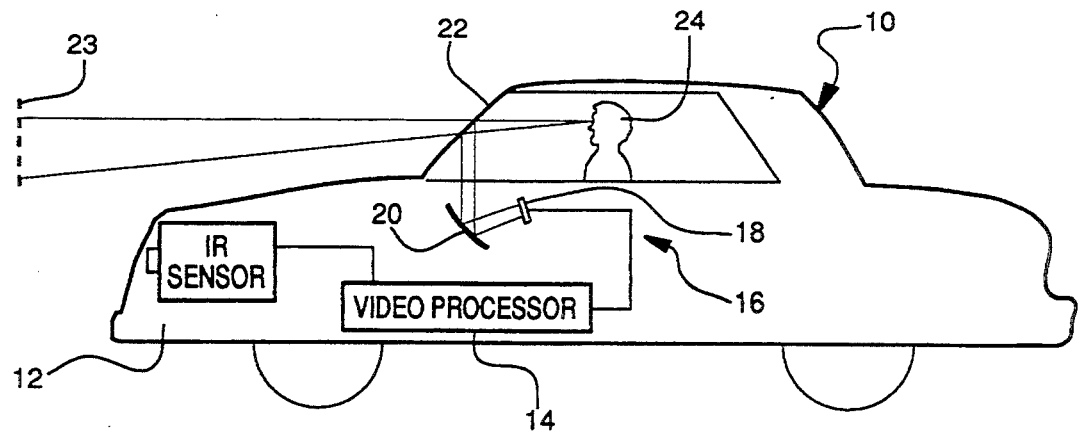
FIG - 1
FIG - 3
FIG - 2
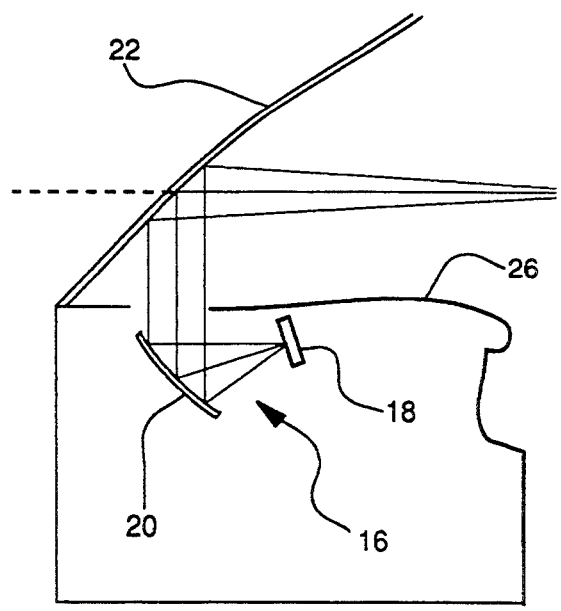
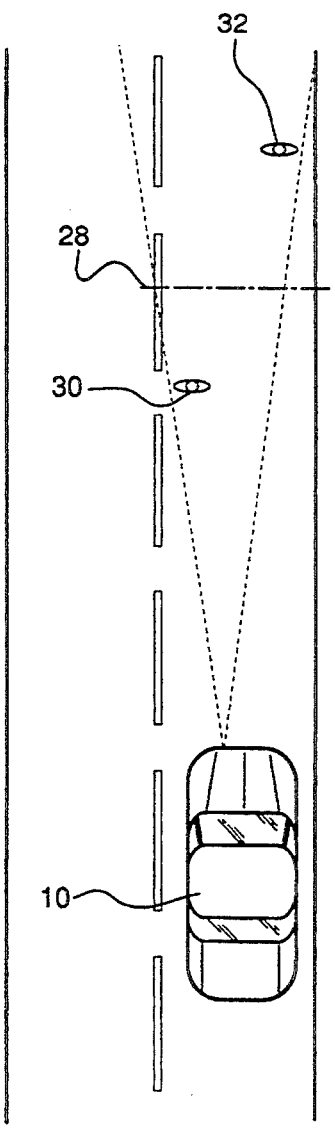

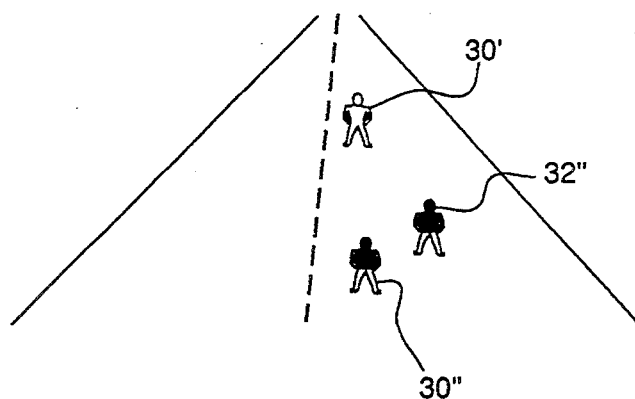
FIG - 4
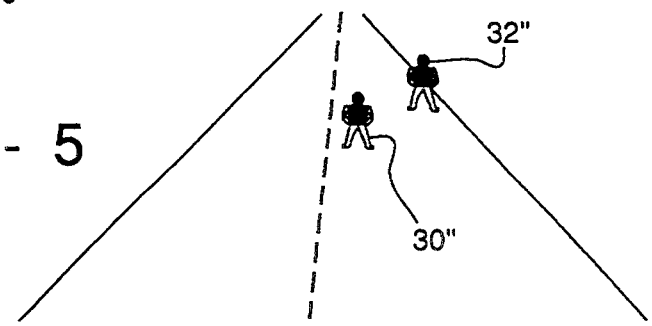
FIG - 5
FIG - 6
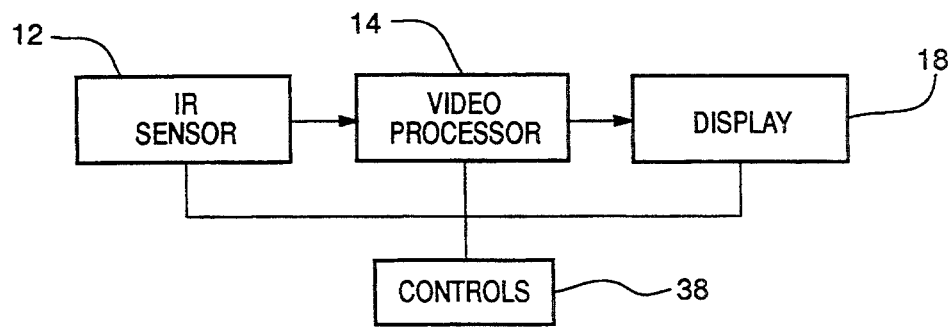
FIG - 7
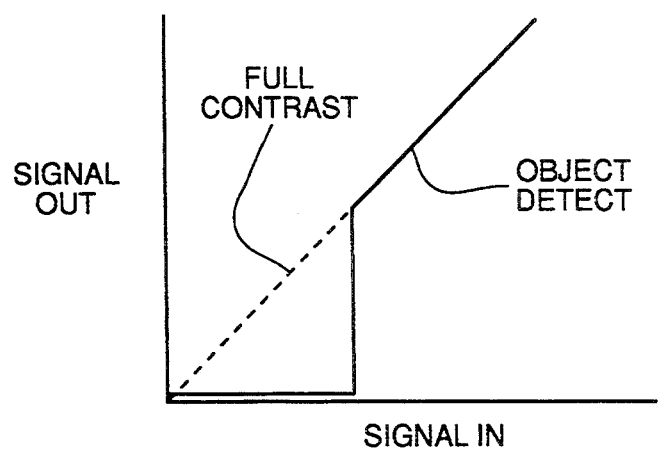

HEAD UP DISPLAY WITH NIGHT VISION ENHANCEMENT

FIELD OF THE INVENTION

This invention relates to a night vision enhancement system for motor vehicles and particularly to such a system incorporating head up display technology.

BACKGROUND OF THE INVENTION

It has often been proposed to use infrared cameras to produce images of a roadway revealing warm objects such as humans, animals or other sources of infrared radiation. This has the advantage of detecting such objects at night particularly if they are beyond the range of vehicle lights. Such systems have typically used a video monitor or the like to display the detected objects. A traditional monitor is bulky and difficult to locate in a convenient place for viewing, and requires the operator to look away from the roadway to observe the infrared image. The image would be quite small relative to the real roadway scene so that there could be some difficulty in accurately judging the distances of the objects being displayed. Thus if an object is not visible in the real scene, it is hard to determine its location.

It is also known to employ head up display techniques to project instrument images or vehicle parameter data onto the vehicle windshield or other combiner so that the display is in or immediately adjacent to the operator's line of sight. Such displays have been quite small relative to the roadway scene due to the limited space available for the required image source and projection mirrors.

SUMMARY OF THE INVENTION

It is therefore an object of the invention to enhance night vision by infrared imaging in the line of sight of a vehicle operator. Another object is to display object images from an infrared source which have a one to one ratio with real objects observed by the operator.

The invention is carried out by an infrared sensor or camera mounted on a vehicle to view the roadway in front of the vehicle and generate a video signal representing the thermal image of the roadway, a video processor for improving characteristics of the video signal, and a head up display (HUD) having a video display responsive to the video signal, and an aspheric mirror for reflecting the display image onto the vehicle windshield or other combiner so that the vehicle operator can view a virtual image of the display image which appears to be in front of the vehicle. The optical parameters of the camera and of the HUD are chosen to provide a 1:1 ratio of the image and the real scene observed by the operator.

By placing the image directly in the operator's field of view the image can be superimposed on the real scene. Then the warm objects in front of the vehicle will be highlighted if they are illuminated by the headlight beam, and they will be displayed in proper relationship to illuminated objects even if they are beyond the range of the lights. Alternatively, the image is directed a few degrees below the primary field of view so that the infrared image appears just below the real scene. The latter approach is easier since no image registration is necessary as it is for the superimposed images. Still, by virtue of the 1:1 image ratio, the real position of a warm object shown in the HUD display is readily determined.

In the infrared camera, due to the high cost of lenses suitable for infrared, focusing mirrors are used for the camera optics, and these tend to introduce image distortion. In one design, for example, otherwise horizontal lines tend to droop at both ends to produce a "frown effect". The aspheric mirror is designed to correct for that distortion. The aspheric mirror has previously been used to compensate for distortion due to windshield curvature, each style of windshield requiring a custom designed mirror. In this system, the aspheric mirror design must take into account the camera distortion as well as the windshield distortion.

The video processor can be set to an "object detect" mode, if desired, to select only the signals from the warmest objects so that those objects will be displayed and other background objects will be suppressed. This will attract the operator's attention to the warmest objects which are generally the most important ones to be made aware By operator selection, however, a full contrast mode can be employed to display all the infrared information.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic view of a night vision enhancement system mounted in a vehicle according to the invention;

FIG. 2 is the display portion of the system of FIG. 1;

FIG. 3 is a top view of a roadway scene showing an infrared camera view of the scene;

FIGS. 4 and 5 are illustrations of operator views of night vision enhancement display for two different display configurations;

FIG. 6 is a block diagram of a camera and display portion of the system according to the invention; and FIG. 7 is a graph of video signals according to selectable modes of operation.

DESCRIPTION OF THE INVENTION

Referring to FIGS. 1 and 2, a vehicle 10 is equipped with night vision apparatus comprising a front-mounted infrared camera 12 or sensor which has a standard RS-170 video output signal, a video processor 14 connected to the camera 12 output, and a head up display (HUD) system 16 including an image source or display 18 connected to the video processor output, and an aspheric mirror 20 which reflects the display image to the vehicle windshield 22, creating a virtual image 23 for viewing by the vehicle operator 24. The display 18 recreates the image in shades of gray. A separate combiner may be used instead of the windshield. The HUD 16 is installed beneath the vehicle dash 26 which has an upper opening for light passage to the windshield.

The infrared camera 12 preferably has a field of view of about 12 degrees or more horizontally and a smaller vertical field in the range of 6–9 degrees. While a camera having a wider angle may be used, only the image portion within the prescribed angle should be displayed for optimum effect. The horizontal view of the camera is illustrated in FIG. 3 which depicts the vehicle on a two lane roadway. The limit of the headlight range is indicated by the dashed line 28. A first person 30 is shown in the lane of the vehicle within the headlight range and a second person 32 is shown beyond the headlight range.

The infrared camera 12 comprises a sensing element operable at room temperature (i.e., cryogenic cooling is not required) and focusing optics which use mirrors instead of lenses. The camera senses the thermal pattern or the image of infrared radiation in its field of view. Preferably the camera should be sensitive to radiation in the mid-infrared range or about 8-12 microns. Since hot objects radiate more infrared energy then cool objects, the hot or warm objects will yield stronger signals. Thus animals, including humans, which are warm show up prominently in the image. Other heat emitters such as vehicle lights and exhaust pipes or traffic lights also show up very well. By presenting this information to the vehicle operator, the direct visual image of the roadway and its environs is augmented.

A common side effect of camera mirror arrangements is some image distortion, particularly a drooping at each side of the image. The video signal output from the camera to the display transfers that distortion to the display image. To avoid misinterpretation of the display by the operator it is desirable to correct for the distortion. Accordingly, the aspheric mirror 20 is shaped to compensate for that distortion as well as any distortion arising from the windshield curvature.

The aspheric mirror 20 is positioned to project the image to the windshield 22 or other combiner where it is reflected to the operator 24 as a virtual image which appears to be just at the front of the vehicle. The size of the image is consistent with the real scene observed by the operator. For example, if an object subtends an angle of one degree in the real image, the virtual image will also subtend an angle of one degree. The location of the image may be low in the windshield, or just above the end of the headlight range in the windshield. It also may be registered with the real image; in that case the image should be projected a large distance in front of the vehicle to reduce parallax arising from the distance between the camera and the operator's eyes. In practice, using a camera having a 12 degree field of view (or using a 12 degree portion of a larger field), and an LCD display 81 mm wide, a 6× magnification by the aspheric mirror created a virtual image having a 12 degree field of view, thereby affording a 1:1 ratio of the image to the real world scene.

FIG. 4 represents the real and the display imaged seen by the operator for the FIG. 3 condition. The real image 30' of the person 30 illuminated by the vehicle headlights is visible to the operator but the person 32 is invisible. Both figures are detected by the IR camera and displayed as virtual images 30" and 32" below the real image 30'. The Image 30" appears to be the same size as the image 30'. Thus the operator is forewarned of the presence of the second person 32 in the roadway. FIG. 5 illustrates the condition where the HUD image is superimposed on the real image thereby correctly placing the HUD image in the roadway. This technique is more difficult to implement due to concerns of parallax caused by the separation of the camera from the operator, and the normal movement of the operators head. A very satisfactory display location had been found to be at the lower part of the windshield where the central ray of the image is 5 degrees below horizontal.

As shown in FIG. 6, the video processor 14 couples the video signal from the camera 12 to the LCD display 18, each being subject to controls 38. The controls should be easily accessible to the operator by mounting on the steering wheel or the instrument panel. Voice activation is another potential technique for control operation. The controls may select image polarity at the camera 12 to establish hot objects to be either white or black. The full contrast mode or object detect mode may be selected at the video processor 14. This is accomplished by passing the whole signal range for full contrast or suppressing weak (cool) signals to display only the warmer objects. FIG. 7 shows in solid lines that low input video signals are suppressed for the object detect mode, while full contrast is shown in dotted line wherein the whole signal is passed to the display 18. Gray limit adjustment is also made at the processor 14. The display 18 is controlled to adjust brightness, adjust image position, or to turn the image on or off.

It will thus be seen that the night vision enhancement system provides both a very practical implementation as well as a very flexible system in terms of how the infrared image is presented in or adjacent to the operators line of sight. The 1× magnification permits an intuitive assessment of the virtual image and the relationship of IR images to the real world scene, thereby providing roadway information which is not normally available and presenting it in its most useful form.

The embodiments of the invention in which an exclusive property or privilege is claimed are defined as follows:

1. A night vision system for a motor vehicle comprising:
   an infrared camera mounted on the vehicle for viewing a roadway scene in front of the vehicle and producing a video signal representing the thermal pattern of the scene;
   a head up display comprising a combiner in the field of view of a vehicle operator, a video display for emitting an image, and an aspheric mirror for reflecting the image onto the combiner for viewing by the operator as a virtual image;
   the video display being responsive to the video signal for displaying the thermal pattern as a visible image; and
   the video display and aspheric mirror together affording a one-to-one size ratio of the virtual image to the real roadway scene observed by the operator.

2. The invention as defined in claim 1 wherein the infrared camera distorts the roadway scene and the aspheric mirror compensates for the camera distortion.

3. The invention as defined in claim 1 wherein:
   the combiner comprises a vehicle windshield which introduces distortion of the video image;
   the infrared camera introduces distortion of the scene; and
   the aspheric mirror compensates for the distortion from both sources so that the virtual image is substantially free of distortion.

4. The invention as defined in claim 1 wherein the horizontal field of view of the virtual image is on the order of 12 degrees.

5. The invention as defined in claim 1 wherein:
   the video display displays an image having the same field of view as the virtual image.

6. The invention as defined in claim 1 wherein:
   the horizontal field of view of the virtual image is on the order of 12 degrees; and
   the field of view of the camera is substantially the same as that of the displayed virtual image.

7. The invention as defined in claim 1 wherein the virtual image is positioned below the operators line of sight to the real roadway scene.

8. The invention as defined in claim 1 wherein the virtual image is superimposed on the real roadway scene to augment the real scene.

9. The invention as defined in claim 1 wherein the video signal is coupled to the video display by a video processor; and the video processor includes object detection means for limiting the signal to the warmest objects in the scene, thereby reducing image content and emphasizing warm objects.

10. The invention as defined in claim 1 wherein the video signal is coupled to the video display by a video processor which includes:

an object detection mode for limiting the signal to the warmest objects in the scene, thereby reducing image content while displaying the warmest objects;

a full contrast mode for including a wide thermal range of object images in the signal thereby increasing the image content; and an operator control for selecting an object detection mode or a full contrast mode.

* * * * *